United States Patent
Waslowski

(10) Patent No.: US 11,372,107 B2
(45) Date of Patent: Jun. 28, 2022

(54) TRIANGULATION PHOTOELECTRIC PROXIMITY SENSOR

(71) Applicant: SICK AG, Waldkirch (DE)

(72) Inventor: Kai Waslowski, Waldkirch (DE)

(73) Assignee: SICK AG, Waldkirch (DE)

( * ) Notice: Subject to any disclaimer, the term of this patent is extended or adjusted under 35 U.S.C. 154(b) by 756 days.

(21) Appl. No.: 16/257,470

(22) Filed: Jan. 25, 2019

(65) Prior Publication Data
US 2019/0242998 A1 Aug. 8, 2019

(30) Foreign Application Priority Data

Feb. 2, 2018 (DE) .......................... 102018102402.9

(51) Int. Cl.
*G01S 17/48* (2006.01)
*G01S 17/02* (2020.01)
(Continued)

(52) U.S. Cl.
CPC .............. *G01S 17/48* (2013.01); *G01S 7/497* (2013.01); *G01S 17/04* (2020.01); *G08B 13/183* (2013.01)

(58) Field of Classification Search
CPC .......... G01S 7/497; G01S 17/04; G01S 17/48; G08B 13/183
See application file for complete search history.

(56) References Cited

U.S. PATENT DOCUMENTS 4,943,157 A * 7/1990 Reding ................. G01S 7/4818
356/3.06
5,870,178 A * 2/1999 Egawa ..................... G02B 7/32
356/3.03
(Continued)

FOREIGN PATENT DOCUMENTS

CZ 286125 B6 * 1/2000 ............. G01S 17/04
DE 4427724 A1 * 2/1996 ............. G01S 17/48
(Continued)

OTHER PUBLICATIONS

Office Action dated Jan. 7, 2019 issued in corresponding German Application No. 10 2018 102 402.9.
German Office Action dated Jan. 7, 2019 corresponding to application No. 102018102402.9.

*Primary Examiner* — Sang H Nguyen
(74) *Attorney, Agent, or Firm* — Nath, Goldberg & Meyer; Jerald L. Meyer

(57) ABSTRACT

Triangulation photoelectric proximity sensor (1) having a first light emitter (2) for emitting transmitted light into a detection zone (3), a transmitting optical system (4), in particular a lens, being arranged upstream of the light emitter (2), a first light receiver (6) having an array of receiving elements (5) for receiving light from the detection zone (3), which is remitted by an object (7) to be detected, the receiving elements (5) generating respective received signals, a receiving optical system (8) arranged in the beam path between detection zone (3) and first light receiver (6) for generating a light spot from the remitted light on the first light receiver (6), wherein the position of the light spot in the triangulation direction on the first light receiver (6) results in dependence on the distance of the object (7), and a control and evaluation unit (9) for generating a detection signal from the received signals on the basis of the position of the light spot on the first light receiver (6), wherein a further second light transmitter (2) is provided as a reference light transmitter (12) for safety-oriented self-testing.

9 Claims, 2 Drawing Sheets

Figure 1:
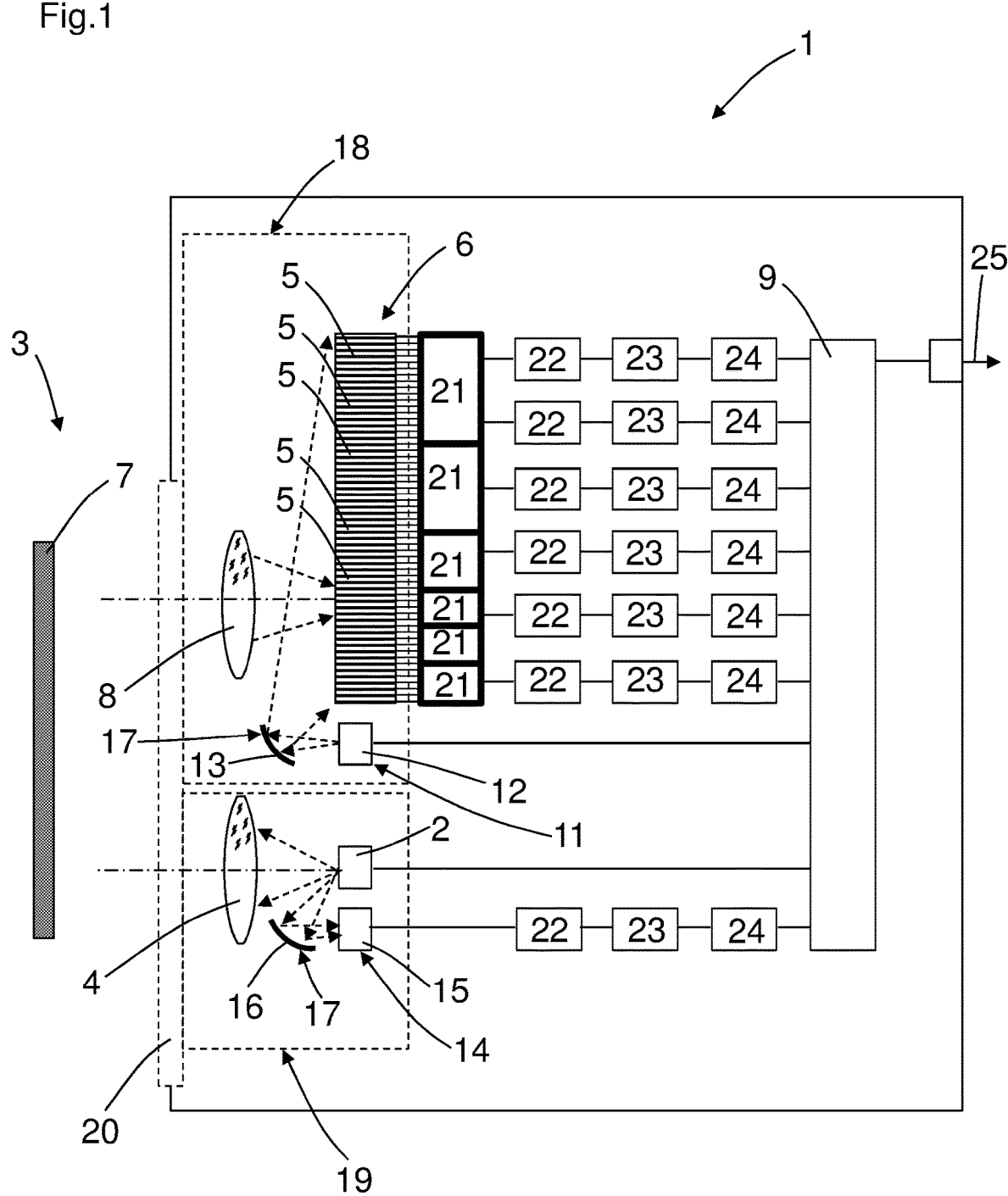

(51) Int. Cl.
  *G08B 13/183*  (2006.01)
  *G01S 7/497*  (2006.01)
  *G01S 17/04*  (2020.01)

(56) References Cited

U.S. PATENT DOCUMENTS

| | | | | |
|---|---|---|---|---|
| 2002/0097404 | A1* | 7/2002 | Waslowski | G01S 17/48 |
| | | | | 356/623 |
| 2008/0130005 | A1* | 6/2008 | Waslowski | G01V 8/20 |
| | | | | 356/446 |
| 2013/0215409 | A1* | 8/2013 | Wiethege | G01C 3/08 |
| | | | | 356/3.01 |
| 2014/0091219 | A1* | 4/2014 | Schaefer | G01N 21/53 |
| | | | | 250/338.5 |
| 2016/0171776 | A1* | 6/2016 | Bridges | G01S 3/786 |
| | | | | 348/47 |
| 2019/0179014 | A1* | 6/2019 | Waslowski | G01S 17/48 |

FOREIGN PATENT DOCUMENTS

| | | | | |
|---|---|---|---|---|
| DE | 102006032113 | B3 * | 9/2007 | ............ G01S 17/48 |
| DE | 102006032113 | C5 | 1/2010 | |
| DE | 202014005508 | U1 | 11/2014 | |
| EP | 2 199 999 | A1 | 6/2010 | |
| EP | 2199999 | A1 * | 6/2010 | ............ G01V 8/22 |
| EP | 2637036 | A1 | 9/2013 | |
| EP | 3091272 | A1 | 11/2016 | |

\* cited by examiner

TRIANGULATION PHOTOELECTRIC PROXIMITY SENSOR

The present invention concerns a triangulation photoelectric proximity sensor according to the preamble of claim 1.

It is known to determine the presence and/or removal of objects in a surveillance area using light sensors operating on the triangulation principle. Such a triangulation sensor comprises a light transmitter, for example a light-emitting diode or a laser, and optionally a transmitting optical system, in order to transmit a transmitted light beam into a detection zone to an object which may be located there and is to be detected. The transmitted light can be remitted by such an object, i.e. reflected diffusely or specularly, and detected by a light receiver, which together with a receiving optic forms a receiving unit. In known solutions, the light receiver consists of at least one line of photosensitive receiving elements.

Depending on the distance between the triangulation sensor and the remitting object, the position of a light spot generated by the remitted light on the light receiver changes in the so-called triangulation direction. There is a clear geometric relationship between the point of impact on the light receiver and the distance of the object detected. By evaluating a light distribution on the light receiver, the distance between the object and the light sensor can be determined. Furthermore, by evaluating the light distribution on the light receiver, it can be determined whether an object lies within or outside a predetermined limit, also known as the scanning distance.

In order to achieve high accuracy in distance determination in particular, such a light receiver must have a large number of photosensitive receiving elements arranged side by side in the triangulation direction.

In triangulation light sensors with background suppression, the light receiver comprises at least two receiving elements, a so-called near element being arranged in such a way that it is hit by a light beam when the beam is reflected by an object which is located within a near range in front of the triangulation light sensor. By definition, the far range is further away from the triangulation sensor than the near range. For signal evaluation, a difference is formed between the photodiode currents of these two ranges.

In the following, the construction of a light switch according to the state of the art for an industrial application is described. One task is object detection in a surveillance area. A transmission pulse generator generates a periodic, digital control signal for the transmission stage. The control signal can, for example, consists of simple or complex pulse patterns. The transmission stage generates a time-varying transmission current from the digital control signal. The amplitude of the transmission current can usually be parameterized. The light transmission diode converts the transmission current into optical power. The transmitting optics include a transmitting tube, apertures, a transmitting lens and a front screen. The surveillance area contains the entire space to be monitored in front of the sensor and can contain the object to be detected, a background object, a reflector or other disturbing objects such as mirrors, lamps or external light sources.

A receiver optic includes a receiver tube, apertures, a receiver lens, and the front screen. The receiver elements are a plurality of photodiodes for the conversion of optical power into current and are arranged e.g. in a line. An evaluation circuit calculates an object detection signal from the temporal profile of the signal of the receiver elements and from the knowledge of the control signals of the transmission stage. The object detection signal is output via a physical switching output.

If this light switch is used in the embodiment of a photoelectric proximity sensor, it should be detected whether an object is located on the transmitting axis within a previously defined distance, namely in the monitoring area. This object can be a person, for example. If this person could be injured within the monitored area by the action of a machine and the photoelectric sensor has to reduce this risk by switching off the machine, then the safety of the overall system consisting of the machine, control system and photoelectric sensor must be considered. This consideration is simplified if the light switch monitors its own function and switches to the safe state in the event of an error.

The state of the art shown has the disadvantage that the entire signal flow runs through the monitoring area. It is therefore not possible to test the blocks like the transmitting stage, transmitting diode, transmitting optics, receiving optics and receiver elements, without a known well-defined monitoring area.

The problem can be solved by cyclically introducing a reference object into the beam path and in this state well defining the block surveillance area. In this operating state, the output signals of the receiver elements and/or downstream blocks, for example, can then be compared with reference signals in the evaluation circuit. In the event of deviations, the system switches to a safe state.

The disadvantage of this solution is the effort required to develop and create this solution and the reduction of machine throughput, since part of the productive time must be used for reference runs and reference measurements.

It is an object of the invention to provide a safe triangulation photoelectric proximity sensor in the sense of machine safety.

The task is solved by a triangulation photoelectric proximity sensor having a first light transmitter for emitting transmitted light into a detection zone, the light transmitter being preceded by a transmitting optical system, in particular a lens, a first light receiver having an array of receiving elements for receiving light from the detection zone, the light is remitted by an object to be detected, the receiving elements generating respective received signals, a receiving optical system arranged in the beam path between detection zone and first light receiver for generating a light spot from the remitted light on the first light receiver, the position of the light spot on the first light receiver in the triangulation direction being a function of the distance of the object, and a control and evaluation unit for generating a detection signal from the received signals on the basis of the position of the light spot on the first light receiver, wherein a further second light transmitter is provided as a reference light transmitter for safety-related self-testing.

The triangulation light sensor is a safety sensor. A safety sensor should have the highest possible safety integrity level (SIL) in accordance with safety standard IEC 61508/IEC 61511. According to this invention, safety is safety in the sense of machine safety. For example, the EN/IEC 61496 standard regulates the requirements for a safe sensor or a safe electro-sensitive protective device (ESPE) for safeguarding hazardous areas. Machine safety is regulated in standard EN13849. Safety is ensured, for example, by a two-channel or diverse redundancy design of the control and evaluation unit for fault detection and functional testing. The distance-measuring triangulation light sensor or distance sensor according to this invention, for example, is intrinsically safe and detects internal faults. If an error is detected, for example, an error signal is generated. In addition, the triangulation light sensor or distance sensor has a sensor test. The present triangulation photoelectric proximity sensor comprises self-monitoring by internal reference paths.

The control and evaluation unit detects objects in the detection zone or protective field violations by an object or a person and can output a safety-related switch-off signal to stop a dangerous movement of a machine or vehicle or part of a machine or to brake the machine, part of the machine or vehicle. This can be implemented, for example, via safe switching signals such as OSSD signals (Output Safety Switching Device signals) or safe distance data, distance data or safe position data of the intervention event.

According to the invention, a second light transmitter is provided is a reference light transmitter for safety-related self-testing. The reference light transmitter can be integrated next to the light receiver to test the light receiver. This allows the receiver channel to be tested for time response or timing as well as for signal height-dependent effects. The reference light transmitter is preferably mounted close to the light receiver and illuminates the light receiver.

Due to the spatial proximity, the additional reference light transmitter can be implemented with a lower power and therefore more cost-effective light transmitter. The transmitting power of the reference light transmitter, for example, is set so that the signal height corresponds to the actual received signals of the light receiver. The same applies to the time profile of the transmission signal of the reference light transmitter.

To test the light receiver, optical light intensities with different intensity gradients or amplitudes can be used. In particular, overdrive measurements can be carried out easily in this way.

The dynamics of the light receiver can be tested via an adjustable signal height of the reference light transmitter. The reference light transmitter can be constructed with a lower power and thus more cost-effective emitting diode, since a lower emitting power is sufficient to generate comparable signals on the receiver due to the spatial proximity.

By measuring the signal height with different reference amplitudes, the dynamics and sensitivity of the light receiver can be checked. The measurements can also be used to compensate for ageing effects or degradation or to compensate for temperature effects. In the photoelectric proximity sensor, for example, additional reference targets are arranged and the corresponding measurement signals are measured cyclically once.

Furthermore, all receiving elements of the light receiver can be tested, since all receiving elements can be exposed to the light of the reference light transmitter.

A large number of receiving elements are provided. The receiving elements are connected in groups to one multiplexer each. Several multiplexers, for example six multiplexers, are provided, each multiplexer having a group of receiving elements at the inputs and the output of the multiplexer being fed to a current/voltage converter or a transimpedance amplifier. The outputs of the current/voltage converters are each connected to an analog/digital converter. The outputs of the analog-to-digital converters are connected to digital filters, in particular filters with finite impulse response, or FIR filters for short.

The characteristic of FIR filters is that they guarantee an impulse response of finite length. This means that FIR filters, no matter how the filter parameters are selected, can never become unstable or be excited to oscillate independently. The filter signals are fed to the control and evaluation unit.

The control and evaluation unit is also connected to the light transmitter and the reference light transmitter to control them.

In a further embodiment of the inventive subject matter, a first mirror is arranged to direct the light beams of the reference light transmitter to the first light receiver. Thus, the reference light transmitter and the light receiver can be arranged on one side and only a passive mirror as deflecting element is necessary. The mirror can be integrated into the housing of the triangulation photoelectric proximity sensor. The mirror can thus be a simple reflecting surface of the housing.

In a further embodiment of the inventive subject matter, a further second light receiver is provided as a reference light receiver as a second receiving channel for safety-related self-testing.

The reference light receiver is located next to the light transmitter. The reference light receiver can be designed as a photodiode.

The reference light receiver enables the following self-tests for functional testing of the triangulation photoelectric proximity sensor.

Firstly, scattered light within the housing of the triangulation proximity light sensor in the reference light receiver can be used to monitor the power, in particular the laser power, of the light transmitter in each measurement cycle. Large deviations or a failure of the light transmitter can thus be detected.

Secondly, the exact time behavior or timing of the light transmitter can be monitored and any offsets that may occur can be corrected, e.g. in the event of temperature influences.

Thirdly, in the phases in which no light is emitted, the ambient light level can be measured at the reference light receiver. The corresponding measuring signal can be compared with the signal of the light receiver, whereby the sensitivity of the light receiver can be verified and, with optional other scaling, used to check the necessary signal-to-noise ratio in the actual measuring channel.

Additional measured values, which are generated on the light receiver and the reference light receiver, allow a safety-related evaluation of the functional capability.

Direct measurement of the ambient light level on the light receiver and, if necessary, on the reference light receiver enables good determination of the signal-to-noise ratio and safety-related sensitivity of the system.

In a further embodiment of the inventive subject matter, a second mirror is arranged to direct the light beams of the first light transmitter onto the reference light receiver. This allows arranging the light transmitter and the reference light receiver on one common side and only a passive mirror is required as a deflecting element. The mirror can also be integrated into the housing of the triangulation proximity light sensor. The mirror can thus be a simple reflecting surface of the housing.

In a further embodiment of the inventive subject matter, the first mirror and/or the second mirror is a concave mirror. In the case of the second concave mirror, which is intended to deflect light between the light emitter and the reference light receiver, the light is concentrated on the reference light receiver.

In the case of the first concave mirror, which is intended for deflecting light beams between the reference light transmitter and light receiver, the light beam is widened onto the receiving elements so that all receiving elements of the light receiver can be illuminated by the reference light transmitter.

In a further embodiment of the inventive subject matter, the first light receiver and the reference light transmitter are arranged in a first tube, whereby the light receiver and the reference light transmitter are arranged spatially and optically associated, but the light transmitter is arranged optically outside the first tube.

In a further embodiment of the inventive subject matter, the first light emitter and the reference light receiver are arranged in a second tube, whereby the light emitter and the reference light receiver are arranged spatially and optically associated, but the light receiver is arranged optically outside the second tube.

In a further embodiment of the inventive subject matter, the first light emitter and the reference light emitter are activated alternately, whereby a mutual influence is excluded.

In a further embodiment of the inventive subject matter, a front screen is arranged in front of the transmitting optics and in front of the receiving optics, whereby the light of the reference light transmitter hits the front screen and reflected light reaches the light receiver and/or that the light of the first light transmitter hits the front screen and reflected light hits the reference light receiver.

A dirty front screen of the photoelectric proximity sensor can thus be detected by light changes due to backscattering of light at the dirt particles on the front screen.

Figure 2:
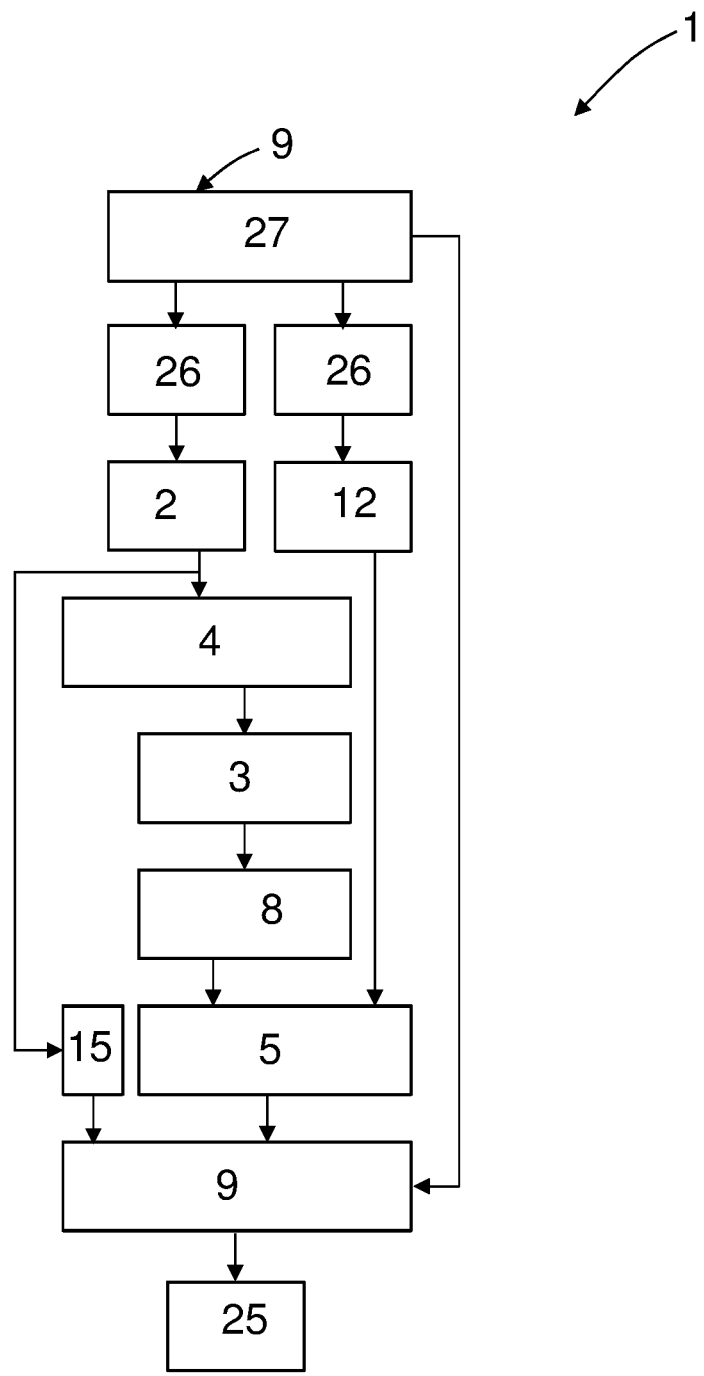

The invention is also explained below with regard to further advantages and features by reference to the attached drawing using embodiments. The figures in the drawing show in:

FIG. 1 a first schematically depicted triangulation photoelectronic proximity sensor;

FIG. 2 a second schematically depicted triangulation photoelectronic proximity sensor.

In the following figures, identical parts are provided with identical reference signs.

FIG. 1 shows a triangulation photoelectronic proximity sensor 1 with a first light emitter 2 for emitting emitted light into a detection zone 3, wherein a transmitting optical system, in particular a lens, is arranged upstream of the light emitter 2, a first light receiver 6 having an array of receiving elements 5 for receiving light from the detection zone 3, which is remitted by an object 7 to be detected, the receiving elements 5 generating respective reception signals, a receiving optical system 8 arranged in the beam path between detection zone 3 and first light receiver 6 for generating a light spot from the remitted light on the first light receiver 6, the position of the light spot on the first light receiver 6 in the triangulation direction being a function of the distance of the object 7, and a control and evaluation unit 9 for generating a detection signal from the received signals on the basis of the position of the light spot on the first light receiver 6, a further second light transmitter 11 being provided as a reference light transmitter 12 for safety-related self-testing.

Safety is ensured, for example, by a two-channel or two-channel diverse design of the control and evaluation unit 9 for fault detection and functional testing.

The control and evaluation unit 9 detects objects 7 in detection zone 3 or protective field violations by an object 7 or a person and can output a safety-related switch-off signal or an object detection signal 25 in order to stop a dangerous movement of a machine or a vehicle or a part of a machine or to brake the machine, the part of the machine or the vehicle. This can be done, for example, via safe switching signals, e.g. OSSD signals (Output Safety Switching Device signals).

The reference light transmitter 12 can be integrated next to the light receiver 6 to test the light receiver 6. The reference light transmitter 12 is preferably mounted close to the light receiver 6 and illuminates the light receiver 6.

To test the light receiver 6, optical light intensities with different intensity gradients or amplitudes can be used.

The dynamics of the light receiver 6 can be tested via an adjustable signal height of the reference light transmitter 12.

By measuring the signal height with different reference amplitudes, the dynamics and sensitivity of the light receiver 6 can be checked.

All receiving elements of the light receiver 6 can be tested, since all receiving elements can be exposed to the light of the reference light transmitter 12.

A large number of receiver elements 5 are provided. The receiving elements 5 are connected in groups to a multiplexer 21, respectively. Several multiplexers 21 are provided, for example six multiplexers 21, whereby each multiplexer 21 has a group of receiving elements 5 at the inputs and the output of the multiplexer 21 is fed to a current/voltage converter 22 or a trans-impedance amplifier. The outputs of the current/voltage converters 22 are each connected to an analog/digital converter 23. The outputs of the analog/digital converters 23 are connected to digital filters, especially filters with finite impulse response, short FIR filter 24.

The filter signals are fed to the control and evaluation unit 9. The control and evaluation unit 9 is also connected to the first light transmitter 2 and the reference light transmitter 12 in order to control them.

According to FIG. 1, a first mirror 13 is arranged to direct the light beams of the reference light transmitter 12 onto the first light receiver 6. Thus, the reference light transmitter 12 and the light receiver 6 can be arranged on one common side and only a passive mirror 13 is necessary as a deflecting element.

According to FIG. 1, a second light receiver 14 is provided as a reference light receiver 15 as a second receiving channel for safety-related self-testing.

The reference light receiver 15 is located next to the first light transmitter 2. The reference light receiver 15 can be designed as a photodiode. The reference light receiver 15 enables a self-test for functional testing of the triangulation light sensor 1.

According to FIG. 1, a second mirror 16 is arranged to direct the light beams of the first light transmitter 2 onto the reference light receiver 15.

According to FIG. 1, the first mirror 13 and the second mirror 16 are concave mirrors 17. In the case of the second concave mirror 17, which is intended to deflect light between light emitter 2 and reference light receiver 15, the light is focused on the reference light receiver 15.

In the case of the first concave mirror 17, which is intended for deflecting light beams between the reference light transmitter 12 and the light receiver 6, the light is widened onto the receiving elements 5 so that all receiving elements 5 of the light receiver 6 can be illuminated by the reference light transmitter 12.

According to FIG. 1, the first light receiver 6 and the reference light transmitter 12 are arranged in a first tube 18, whereby the light receiver 6 and the reference light transmitter 12 are arranged spatially and optically associated, but the first light transmitter 2 is arranged optically outside the first tube 18.

According to FIG. 1, the first light emitter 2 and the reference light receiver 15 are arranged in a second tube 19, whereby the light emitter 2 and the reference light receiver 15 are arranged spatially and optically associated, but the light receiver 6 is arranged optically outside the second tube 19.

According to FIG. 1, the first light emitter 2 and the reference light emitter 12 are activated alternately, which excludes mutual interference.

According to FIG. 1, a front screen 20 is arranged in front of the transmitting optic 4 and in front of the receiving optic 8, whereby the light of the reference light transmitter 12 strikes the front screen 20 and reflected light reaches the light receiver 6 and/or that the light of the first light transmitter 2 strikes the front screen 20 and reflected light strikes the reference light receiver 15.

FIG. 2 shows the triangulation photoelectronic proximity sensor a schematic representation for forming an object detection signal 25. A transmission pulse generator 27, which is part of the control and evaluation unit 9, controls the first light transmitter 2 and the reference light transmitter 12 via the transmission stages 26, respectively. The light from the reference light receiver 15 is transmitted directly to the receiving elements 5. The light from the first light transmitter 2 is transmitted directly to the reference light receiver 15. The reference light receiver 15 and the receiving elements are connected via electronic stages to the control and evaluation unit 9, which generates the object detection signal 25. The light of the first light transmitter 2 reaches the detection zone 3 via the transmitting optics 4 and from there via an object onto the receiving optics 8 and then onto the receiving elements 5.

REFERENCE SIGNS 1 triangulation photoelectric proximity sensor
2 first light transmitter
3 detection zone
4 transmitting optics
5 receiving elements
6 first light receiver
7 object
8 receiving optics
9 control and evaluation unit
11 second light transmitter
12 reference light transmitter
13 first mirror
14 second light receiver
15 reference light receiver
16 second mirror
17 concave mirrors
18 first tube
19 second tube
20 front screen
21 multiplexers
22 current/voltage converter
23 analog/Digital Converter
24 FIR filter
25 object detection signal
26 transmission stage
27 generator for transmitted pulses

The invention claimed is:

1. A triangulation photoelectric proximity sensor (1) with a first light transmitter (2) for emitting transmitted light into a detection zone (3), a transmitting optical system (4) being arranged upstream of the light transmitter (2), a first light receiver (6) having an array of receiving elements (5) for receiving light from the detection zone (3), which light is remitted by an object (7) to be detected, the receiving elements (5) generating respective received signals, a receiving optical system (8) arranged in the beam path between detection zone (3) and first light receiver (6) for generating a light spot from the remitted light on the first light receiver (6), a position of the light spot on the first light receiver (6) in the triangulation direction being a result of a distance of the object (7), and a control and evaluation unit (9) for generating a detection signal from the received signals on the basis of the position of the light spot on the first light receiver (6), wherein a further second light transmitter (2) is provided as a reference light transmitter (12) for safety-related self-testing, and wherein the triangulation photoelectric proximity sensor (1) further comprises a front screen (20) arranged in front of the transmitting optical system (4) and in front of the receiving optical system (8), such that light from the reference light transmitter (12) strikes the front screen (20) and first reflected light reaches the first light receiver (6) and/or the transmitted light from the first light transmitter (2) strikes the front screen (20) and second reflected light strikes a reference light receiver (15).

2. The triangulation photoelectric proximity sensor (1) according to claim 1, characterized in that a first mirror (13) is arranged in order to direct the light beams of the reference light transmitter (12) onto the first light receiver (6).

3. The triangulation photoelectric proximity sensor (1) according claim 1, characterized in that a further second light receiver (14) is provided as the reference light receiver (15) as a second receiving channel for safety-related self-testing.

4. The triangulation photoelectric proximity sensor (1) according to claim 1, characterized in that a second mirror (16) is arranged in order to direct the light beams of the first light transmitter (13) onto the reference light receiver (15).

5. The triangulation photoelectric proximity sensor (1) according to claim 4, characterized in that the first mirror (13) and/or the second mirror (16) is a concave mirror (17).

6. The triangulation photoelectric proximity sensor (1) according to claim 1, characterized in that the first light receiver (6) and the reference light transmitter (12) are arranged in a first tube (18).

7. The triangulation photoelectric proximity sensor (1) according to claim 1, characterized in that the first light transmitter (2) and the reference light receiver (15) are arranged in a second tube (19).

8. The triangulation photoelectric proximity sensor (1) according to claim 1, characterized in that the first light transmitter (2) and the reference light transmitter (12) are activated alternately.

9. The triangulation photoelectric proximity sensor (1) according to claim 1, wherein the transmitting optical system (4) comprises a lens.

* * * * *